United States Patent [19]

Waterman

[11] Patent Number: 5,547,232
[45] Date of Patent: Aug. 20, 1996

[54] REUSABLE SEALED COUPLING FOR TWO PIPES

[75] Inventor: Timothy J. Waterman, Carmel, Ind.

[73] Assignee: Carrier Corporation, Syracuse, N.Y.

[21] Appl. No.: 134,649

[22] Filed: Oct. 12, 1993

[51] Int. Cl.⁶ .................................................. F16L 21/00
[52] U.S. Cl. .......................... 285/236; 285/177; 285/242; 285/383; 285/403
[58] Field of Search ................................. 255/236, 337, 255/383, 403, 423, 242; 285/177

[56] References Cited

U.S. PATENT DOCUMENTS

| | | |
|---|---|---|
| 2,165,920 | 7/1939 | Burnip . |
| 3,108,827 | 10/1963 | Mason ................................. 285/423 X |
| 3,545,794 | 12/1970 | Wise .................................. 255/423 X |
| 3,747,964 | 7/1973 | Nilsen, Jr. ........................... 285/337 |
| 3,913,955 | 10/1975 | Teja . |
| 4,056,273 | 11/1977 | Cassel . |
| 4,194,765 | 3/1980 | Reddy ................................. 285/331 X |
| 4,261,600 | 4/1981 | Cassel ................................. 285/177 |
| 4,480,860 | 11/1984 | Foresta et al. ....................... 285/236 X |
| 5,078,432 | 1/1992 | Seiter ................................. 285/383 X |
| 5,096,206 | 3/1992 | Andre et al. ......................... 285/236 X |
| 5,131,687 | 7/1992 | Marchou .............................. 285/242 |
| 5,190,322 | 3/1993 | Hughes ............................... 255/236 |
| 5,398,976 | 3/1995 | Webb .................................. 285/177 X |

FOREIGN PATENT DOCUMENTS

| | | | |
|---|---|---|---|
| 0635347 | 11/1978 | U.S.S.R. .............................. | 285/242 |
| 768326 | 2/1957 | United Kingdom ................... | 285/236 |
| 1486671 | 9/1977 | United Kingdom ................... | 285/242 |
| 2261926 | 6/1993 | United Kingdom ................... | 285/242 |

*Primary Examiner*—Terry Lee Melius
*Assistant Examiner*—Heather Chun Shackelford

[57] ABSTRACT

A reusable sealed coupling for joining a first pipe having a first internal diameter adjacent a first end thereof which is substantially equal to an outer diameter of a second pipe, the coupling comprising: a coupler capable of receiving the first end of the first pipe within a first portion thereof and an end of the second pipe within a second portion thereof so that the coupler, second pipe, and first pipe achieve mutual overlap in at least one region. The first and second pipes are both set into predetermined positions with respect to the coupler and with respect to one another; and a seal between the coupler, second pipe, said first pipe is created in at least a portion of the region of mutual overlap.

5 Claims, 4 Drawing Sheets 5,547,232

REUSABLE SEALED COUPLING FOR TWO PIPES

BACKGROUND OF THE INVENTION

1. Field of the Invention

This invention relates to a reusable sealed coupling for joining two pipes and more particularly it relates to a reusable sealed coupling for coupling together a vent pipe and an inducer housing in a temperature control apparatus, such as a furnace.

2. Description of the Prior Art

There are numerous applications in which two pipes must be joined together in such a manner as to create a tightly sealed connection. Prior art has addressed this goal for a number of different applications, as, for example U.S. Pat. No. 3,913,955 to Teja for a coupling for vehicle exhaust pipes, U.S. Pat. No. 2,165,920 to Burnip for the joining of sewer pipes and U.S. Pat. No. 4,056,273 to Cassel for pipes in vehicle exhaust systems. None of these resemble the instant invention.

Gas furnaces typically include a primary heat exchanger positioned adjacent a burner box containing burners. During operation of the furnace, a blower moves circulating air over the heat exchanger to produce heated air that is directed to a desired location. Gas is supplied to the burner box by a gas manifold having orifices that direct the gas into the burners. The gas exiting the burners is ignited by an ignitor provided in the burner box. The burners allow combustion of the gas as well as direct heated flue gas into the heat exchanger. The typical heat exchanger includes cells with a channel or pass formed in each cell to direct the flow of flue gas produced by combustion. These cells are positioned side by side in a parallel manner and are provided with a predetermined spacing to allow the blower air to flow around the cells. The blower air is thus heated by convection as it circulates over the cells.

A sheet metal panel or cell panel having burner target plates is typically provided to position the burner box relative to the inlet side of the cells contained in the heat exchanger. An inducer having a motor and fan is typically mounted on the discharge side of the heat exchanger. The inducer is activated to induce a flow of flue gas through the heat exchanger and into vent piping so that the flue gas may be vented to a location exterior to the furnace.

The residential heating industry has advanced with the advent of condensing gas furnaces. These furnaces typically included a primary heat exchanger as well as a condensing heat exchanger. A blower in these condensing furnaces similarly provides circulating air flow over both heat exchangers to produce heated air that may be directed to a desired location by a system of duct-work and registers.

In such condensing furnaces, both the primary heat exchanger and the condensing heat exchanger include cells with a channel or pass formed therein to direct the flow of flue gas produced by combustion. These cells in both the primary and secondary heat exchangers are positioned side by side in a parallel manner and are provided with a predetermined spacing to allow blower air to flow around both groups of heat exchanger cells. Gas is similarly provided to the condensing furnace by a gas manifold having orifices that direct the gas into burners contained in a burner box. The burner box is secured to the inlet side of the primary heat exchanger to align the discharge end of the burners with the inlet ports of the primary heat exchanger cells. The gas is ignited by an ignitor as it exits the burners contained in the burner box. The heated flue gas produced by combustion is then directed into the primary heat exchanger cells.

The condensing heat exchanger of the furnace is configured in a similar manner to its primary heat exchanger. A series of side by side condensing cells is provided. Each of these condensing cells has an inlet port for receiving flue gas discharged from the primary heat exchanger. The inlet ports of the condensing heat exchanger cells are aligned and secured in a sheet metal panel forming the inlet side of the condensing heat exchanger. The inlet side of the condensing heat exchanger is fluidly connected to the discharge side of the primary heat exchanger by a coupling box. The condensing cells function to exchange heat with the clean circulation air and to condense water vapor out of the products of combustion contained in the flue gas. This condensate drains from the condensing cells into a collector box provided on the discharge side of the condensing heat exchanger. The collector box extends through the cell panel below the burner box and includes tubing to further drain the condensate from the box into drain piping. The collector box is provided with an opening to which the intake side of an inducer in fluidly secured. The inducer in the condensing furnace induces the flow of heated flue gas through the cells in both the primary and condensing heat exchangers.

With recent advancements in the art, a commercially feasible condensing gas furnace having four possible installation orientations has been proposed by the assignee of the present invention. Such gas-fired furnaces are known in the art as multi-poise condensing furnaces and are disclosed, for example, in the copending, commonly assigned U.S. patent application Ser. No. 08/089697, entitled "Multi-Poised Condensing Furnace". These multi-poise furnaces are installable with either an upflow, downflow, horizontal-right flow, or horizontal-left flow orientation. They include design features which allow the furnace to function properly and just as efficiently in any one of these four possible installation orientations. One such feature results in proper drainage of condensate from the condensing heat exchanger cells into the collector box irrespective of the selected installation orientation. To accommodate the multi-poise furnace, the inducer employed therein features two optional discharge ports. Depending on the installation orientation, one of the two inducer discharge ports is selected to be connected to the vent piping while the other unused port is capped with an air-tight seal. Because the installation must sometimes carried out on-site without prior knowledge as to which orientation is appropriate, connection of one discharge ports in the inducer housing to the vent pipe will sometimes have to be performed in the field.

The prior art in furnace systems has relied on coupling two pipes together using two hose clamps, with each pipe being clamped to a different section of the coupler. This provided a seal against leakage of flue gas and/or condensate, as well as some degree of rigidity between the two pipes (which could be of differing sizes). Hose clamps are expensive, however, and may be subject to fatigue in those instances when they are repeatedly tightened and released. More importantly, for furnace, as well as other applications, it is desirable that a high degree of rigidity be maintained along the two pipes. It is also desired to provide a form of coupling to be used between a vent pipe and an inducer housing that would be reusable and that would be inexpensive to produce and relatively easy to install and maintain.

SUMMARY OF THE INVENTION

It is therefore a primary object of the present invention to provide an improved sealed coupling between two pipes that affords a high degree of rigidity.

It is another object of the present invention to provide an improved sealed coupling between two pipes that is inexpensive to manufacture.

It is still another object of the present invention to provide an improved sealed coupling between two pipes that is easy to install and maintain.

It is yet another object of the present invention to provide a sealed coupling between an inducer housing and a vent pipe in a furnace which is inexpensive to manufacture, easy to install and maintain, and affords a high degree of rigidity to the joined structure.

These and other objects of the present invention are attained by a reusable sealed coupling for joining a first pipe having a first internal diameter adjacent a first end thereof which is substantially equal to an outer diameter of a second pipe, the coupling comprising: a coupler capable of receiving the first end of the first pipe within a first portion thereof and an end of the second pipe within a second portion thereof so that the coupler, second pipe, and first pipe achieve mutual overlap in at least one region. The first and second pipes are both set into predetermined positions with respect to the coupler and with respect to one another; and a seal between the coupler, second pipe, said first pipe is created in at least a portion of the region of mutual overlap.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
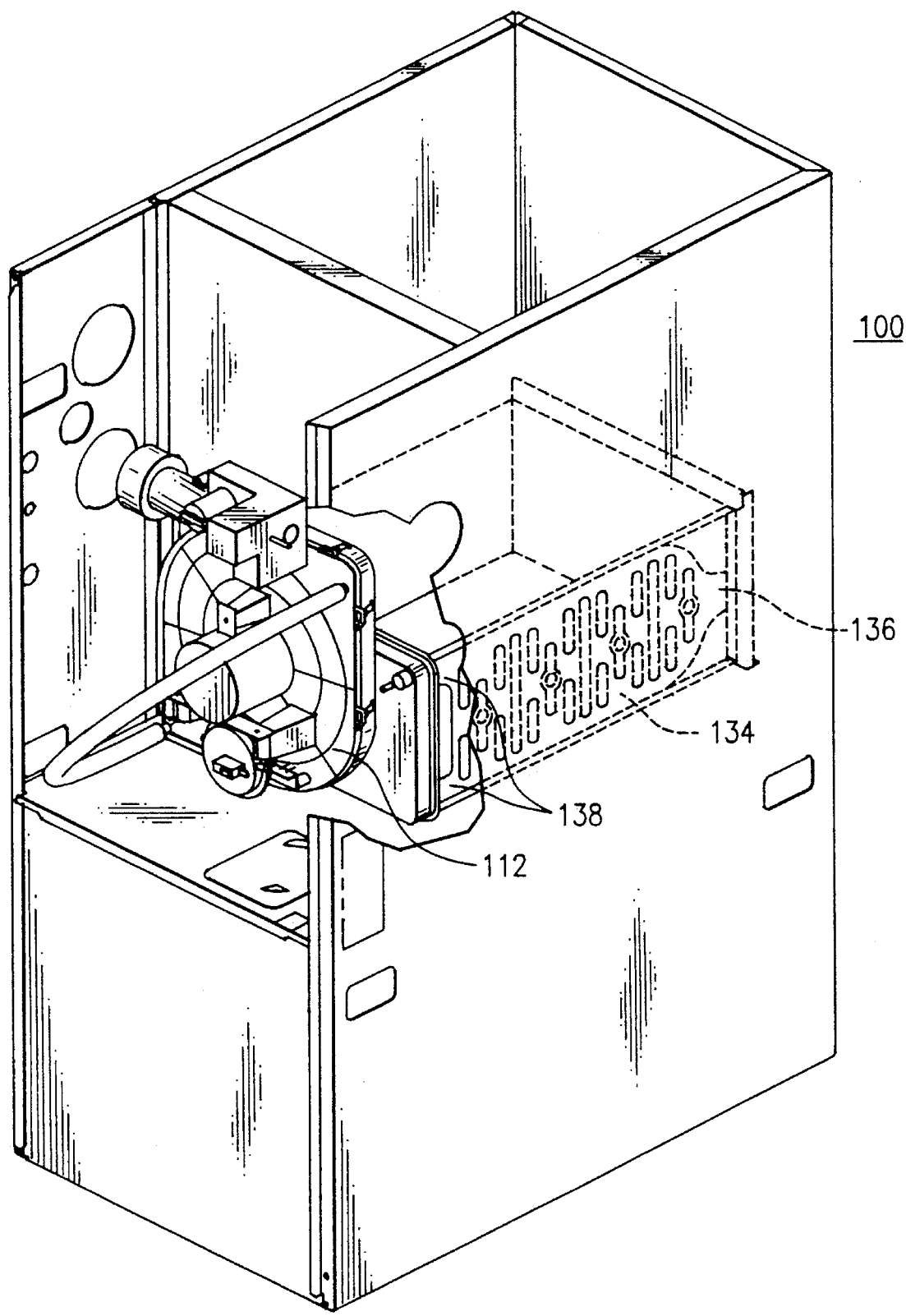
FIG. 1 is a perspective view of a multi-poise furnace incorporating an inducer in accordance with the present invention.
Figure 2:
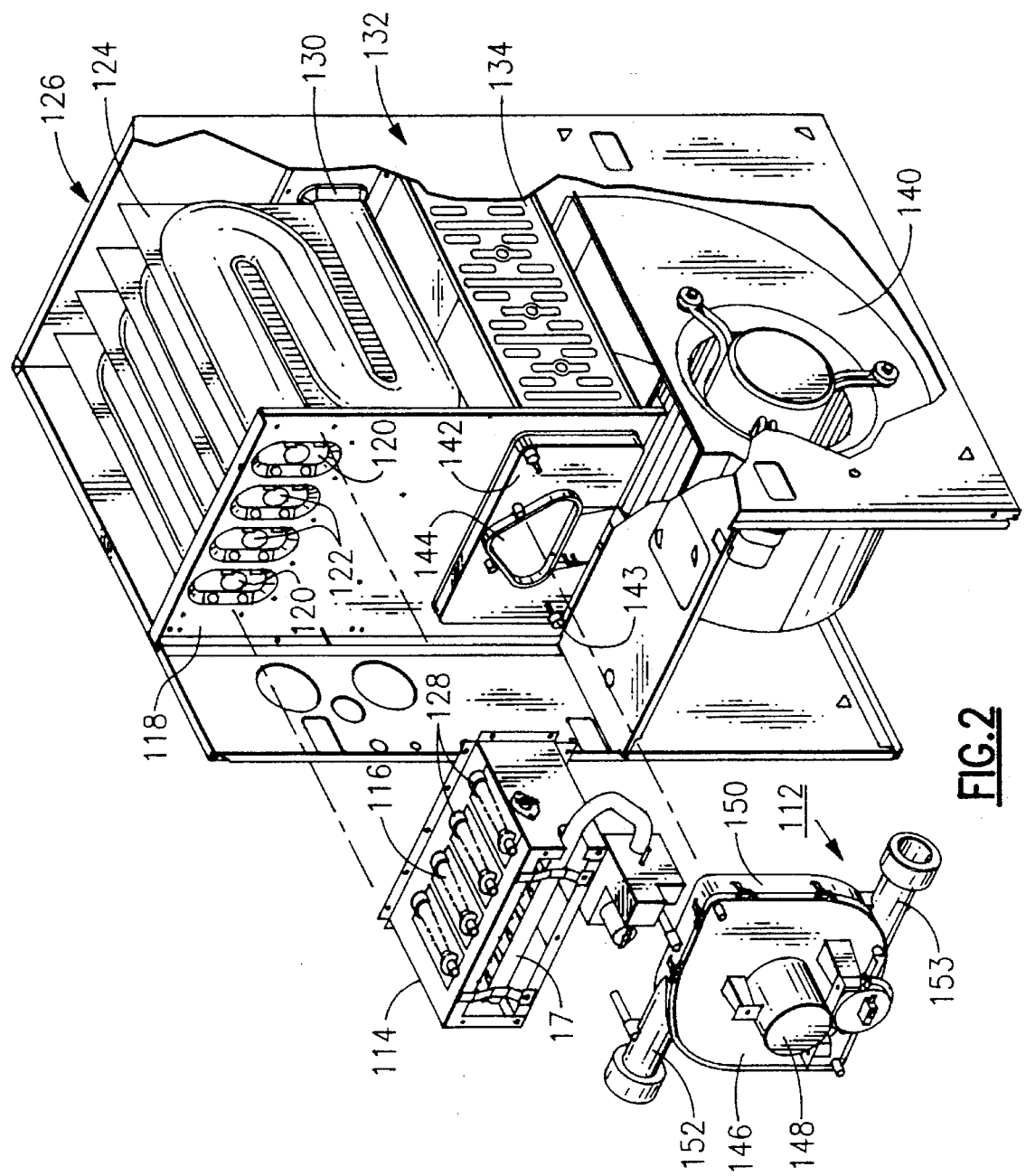
FIG. 2 is a partially cut-away and exploded perspective view of the furnace of FIG. 1.

Referring now to the drawing and initially to FIGS. 1 and 2, there is shown a multi-poise condensing gas furnace 100 having an inducer 112 in accordance with the present invention. The inducer 112 is shown in conjunction with a multi-poise furnace only by way of illustration, it being understood that the connecting and sealing elements according to the invention may be effectively employed in any two pipes where the inner diameter of one pipe may exceed the outer diameter of the other pipe and where an inexpensive and rigid reusable seal is desired therebetween.

The multi-poise condensing furnace 100 includes a burner box 114 having individual burners 116. The individual burners 116 are supplied with gas by a gas manifold 117. The burner box 114 is secured to a cell panel 118 which includes burner target plates 120. Each of the burner target plates 120 includes an inlet port 122 corresponding to the inlet port of individual primary heat exchanger cells 124. The primary heat exchanger cells 124 are contained within a primary heat exchanger 126. Upon assembly, the burner box 114 is secured to the cell panel 118 so that a discharge port 128 of each of the burners 116 is aligned with a corresponding inlet port 122. Gas is supplied to each of the individual burners and is ignited. The products of combustion and heated fluid gas exit the individual burners 116 through a respective discharge port 128 and are thereby directed into the primary heat exchanger cells 124. Each of the primary heat exchanger cells 124 terminate at a discharge port 130.

The multi-poise furnace 100 also includes a condensing heat exchanger 132 which includes a number of condensing heat exchangers cells 134. Each of the condensing heat exchanger cells 134 includes a inlet port 136 and a pair of discharge ports 138. The discharge ports 130 of the primary heat exchanger 126 are fluidly connected to the inlet ports 136 of the condensing heat exchanger 132 by a coupling box (not shown). A blower 140 is provided in the furnace 100 to move circulating air over the heat exchanger cells 130 and 134. As the circulating air moves over the condensing cells 134, water vapor contained within the fluid gas and products of combustion is condensed within the cells 134 and drains from the cells into a collector box 142. The condensate is then drained away from the collector box from a drain tab 143 into drain piping. The collector box 142 includes a main discharge port 144 as shown in FIG. 2.

Referring now to the inducer 112, it is shown that the inducer includes a cover 146. The exterior side of the cover 146 includes motor mounts 147 for securing a motor 148 thereto. The inducer 112 also includes a housing 150. The housing 150 includes a large inlet port (not shown) corresponding to the main discharge port 144 of the collector box 142. The inducer housing 150 also includes a pair of discharge ports 152 and 153 in accordance with the multi-poise aspect of the furnace 100. The upflow installation orientation of the multi-poise furnace 100 is shown in FIGS. 1 and 2. With this installation orientation, the discharge port 153 is sealed and capped off while the discharge port 152 is secured to vent pipe to vent the flue gas to a locating exterior structure containing a furnace 100. Prior to combustion of the gas supplied to the burners 116, the inducer motor 148 is activated so that it will move the heated flue gas through the primary heat exchanger cells 124 as well as the condensing heat exchanger cells 132.

Figure 3:
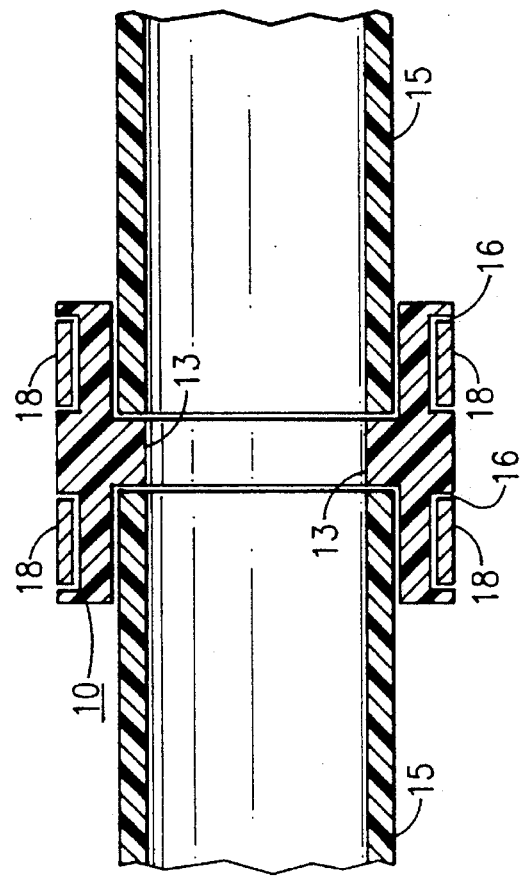
FIG. 3 is a cut-away side view of a sealed coupling for two pipes of the prior art, showing the coupling in use.

Turning now to FIG. 3, the prior art coupling of the inducer housing to the vent pipe can be seen using a coupler labeled, generally 10. This coupler 10 is substantially cylindrical in shape, with a circumferential central protrusion 13 from its inner surface and two circumferential grooves 16,16 in its outer surface. Each of the pipes 15,15 joined by the coupler 10 abuts an opposite shelf or edge of the central protrusion 13, and a pair of hose clamps 18,18 are aligned in grooves 16,16 and tightened in order to provide both a seal and some degree of structural support.

Figure 4:
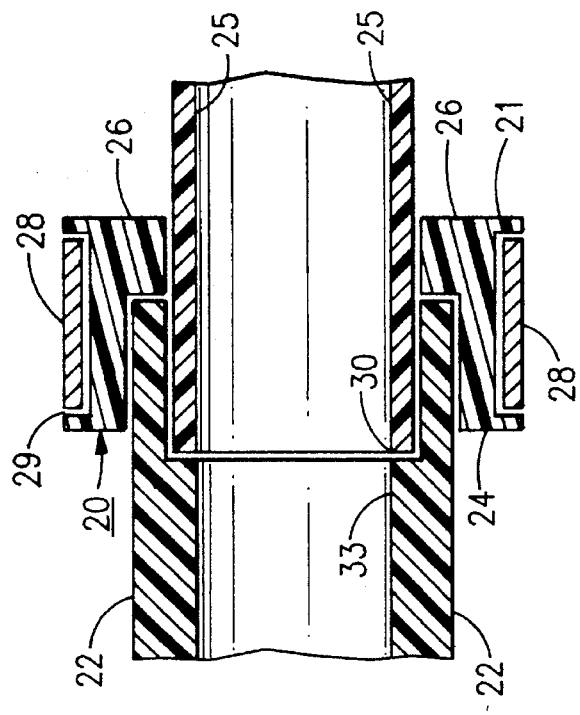
FIG. 4 is a cut-away side view of a sealed coupling of the instant invention, showing the coupling in use.
Figure 6:
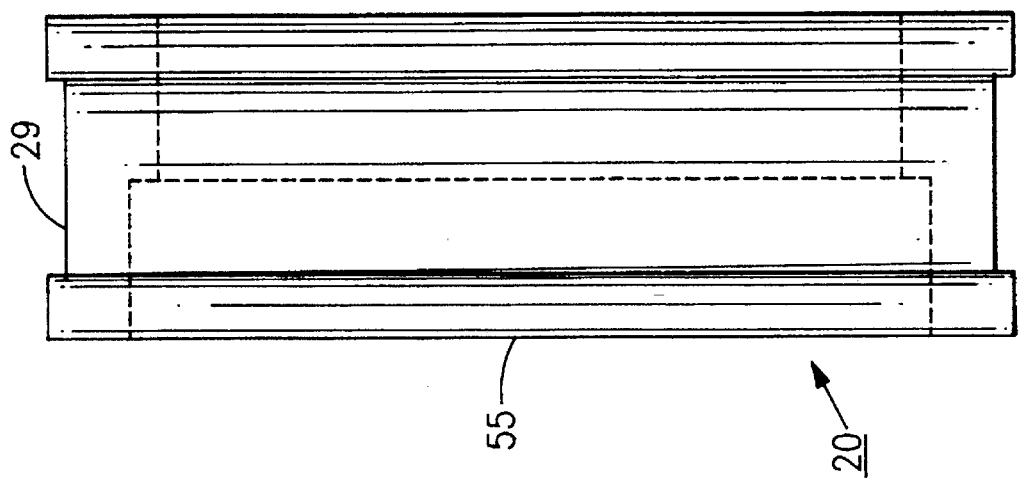
FIG. 6 is a side view of the coupler of FIG. 5.
Figure 5:
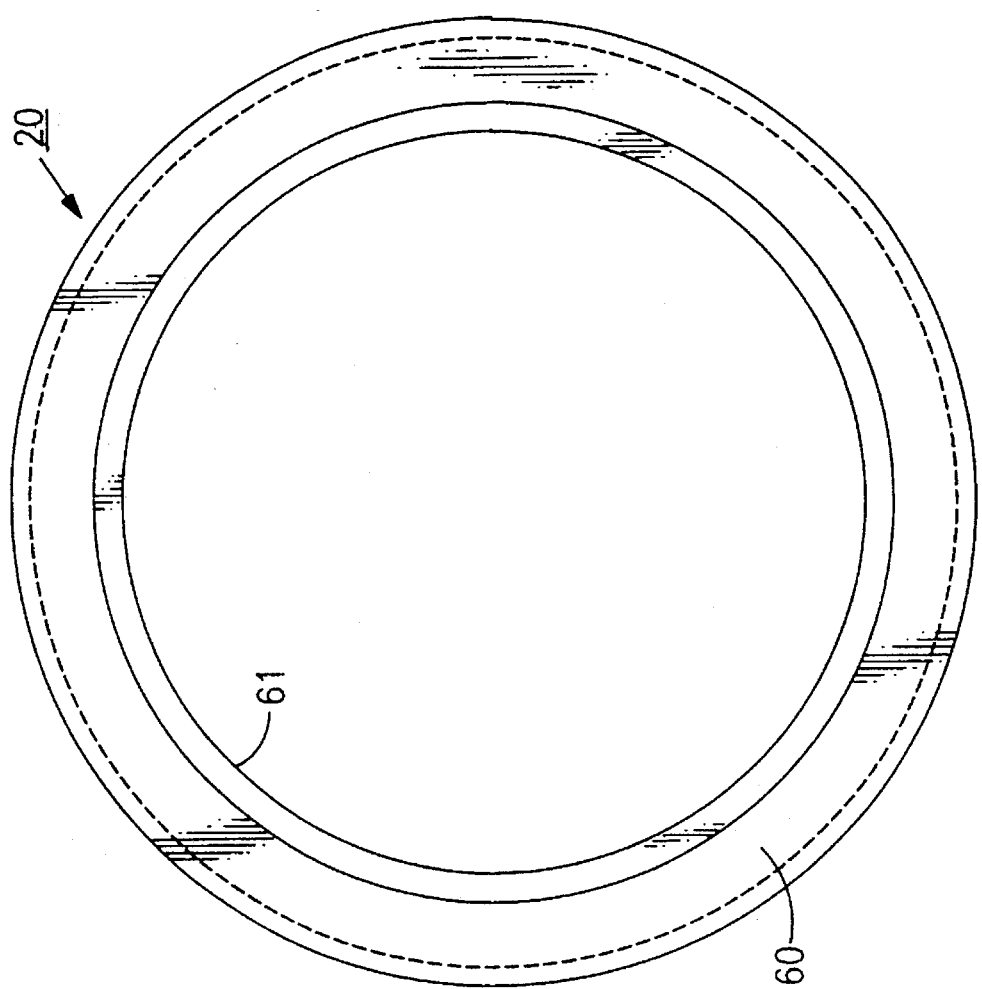
FIG. 5 is cross sectional view of the coupler of FIG. 4.

FIGS. 4–6 show the coupler, labelled generally 20, of the instant invention. Again, the coupler 20 is substantially cylindrical in shape. There is also a protrusion from the inner surface, but this protrusion takes the form of a circumferential ledge 26 which begins at one edge 21 of the coupler and extends substantially halfway to the other edge 24. There is one circumferential groove 29 in the outer surface of the coupler. In addition, the inner surface of the inducer housing 22 is sliced away in the region of end 35 in order to form an interior shelf 33 therein.

In practice, the inducer housing 22, which has a uniform diameter along its entire length, is inserted into coupler 20 and the two are moved inwardly with respect to one another until the end 35 of the inducer housing 22 abuts the coupler shelf 40, formed by ledge 26. PVC vent pipe 25, is then inserted into the open end of coupler 20 and moved inwardly until the pipe end 30 abuts the inner housing shelf 33. Thus both the pipe 25 and the housing 22 are set into predetermined positions with respect to the coupler 20 and with respect to one another. Finally, a single hose clamp 28 is placed about the coupler, seated in groove 29 thereof, and is tightened to ensure sealing against the escape of flue gas and/or condensate. The nesting of the PVC pipe inside the inducer housing provides structural support to the connection and, together, with the clamp, provides the necessary seal. Naturally this requires that the outer diameter of the PVC pipe be substantially the same as that of the internal diameter of the inducer housing adjacent the end that is joined thereto.

In practice, the coupler is composed of neoprene, although other resilient material would be suitable as well. Its length is 25.4 cm with a groove 29 of 15.748 cm in width cut to accommodate the hose clamp 28, leaving lips 55 of 4.83 cm each. The groove is 1.524 cm deep. The outside diameter of the coupler is 78.232 cm, its inside diameter is 60.96 cm in the region of the internal ledge 26, and 65.532 cm where there is no internal ledge 26.

While this invention has been explained with reference to the structure disclosed herein, it is not confined to the details set forth and this application is intended to cover any modifications and changes as may come within the scope of the following claims:

What is claimed is:

1. A reusable sealed coupling and pipe combination with a first pipe having a first uniform, cylindrical outer diameter along its entire length and a first internal diameter adjacent a first end thereof, said first internal diameter being substantially equal to a uniform, cylindrical outer diameter of a second pipe, said combination comprising:

a coupler capable of receiving the first end of the first pipe within a first portion thereof and capable of receiving an end of the second pipe within a second portion thereof so that said coupler, said second pipe, and said first pipe achieve mutual overlap in at least one region, wherein said first pipe and said second pipe are both set into predetermined positions with respect to said coupler and with respect to one another; and means for creating a seal between said coupler, said second pipe, and said first pipe in at least a portion of said one region of mutual overlap wherein an outer surface of said coupler contains a circumferential groove therein, said groove being sized to accommodate a hose clamp; and wherein an outer diameter of the second pipe is substantially uniform and an inner diameter of the first pipe is stepped so that a first inner diameter exceeds a second inner diameter at a location proximate said first end of said first pipe and wherein the end of the second pipe abuts said step.

2. The apparatus of claim 1 wherein an interior portion of said coupler is stepped and wherein the first end of the first pipe abuts said step in said coupler.

3. The apparatus of claim 1 wherein said coupler is comprised of resilient material.

4. The apparatus of claim 3 wherein said coupler is comprised of neoprene.

5. In a furnace, a reusable sealed coupling and pipe combination an inducer housing having a uniform, cylindrical outer along its entire length diameter and an internal diameter adjacent a first end thereof, said internal diameter being substantially equal to a uniform, cylindrical outer diameter of a vent pipe, said combination comprising:

a coupler capable of receiving the inducer housing within a first portion thereof and capable of receiving the vent pipe within a second portion thereof so that said coupler, said vent pipe, and said inducer housing achieve mutual overlap in at least one region, wherein said vent pipe and said inducer housing are both set into predetermined positions with respect to said coupler and with respect to one another; and means fur creating a seal between said coupler, said vent pipe, and said inducer housing in at least a portion of said region of mutual overlap wherein an outer surface of said coupler contains a circumferential groove therein, said groove being sized to accommodate a hose claim; and wherein an outer diameter of the vent pipe is substantially uniform and an inner diameter of the inducer housing is stepped so that a first inner diameter exceeds a second inner diameter at a location proximate said first end of said inducer housing and wherein the end of the vent pipe abuts said step.

* * * * *